No. 877,264.

PATENTED JAN. 21, 1908.

G. H. TRAXEL.
VALVE.
APPLICATION FILED MAR. 30, 1907.

Inventor
George H. Traxel.
By William W. Deane
his Attorney

Witnesses
R. C. Braddock.

UNITED STATES PATENT OFFICE.

GEORGE H. TRAXEL, OF MAYSVILLE, KENTUCKY.

VALVE.

No. 877,264.  Specification of Letters Patent.  Patented Jan. 21, 1908.

Application filed March 30, 1907. Serial No. 365,446.

*To all whom it may concern:*

Be it known that I, GEORGE H. TRAXEL, citizen of the United States, residing at Maysville, in the county of Mason and State of Kentucky, have invented certain new and useful Improvements in Valves, of which the following is a specification.

My invention has reference to valves for automatically controlling the pressure in water and other pipes; and its object is to provide a simple and efficient pressure operated valve, and one which by reason of its construction is well adapted to withstand the usage to which such devices are ordinarily subjected.

The invention will be fully understood from the following description and claims when the same are considered in connection with the accompanying drawings, forming a part hereof, in which—

Figure 1:
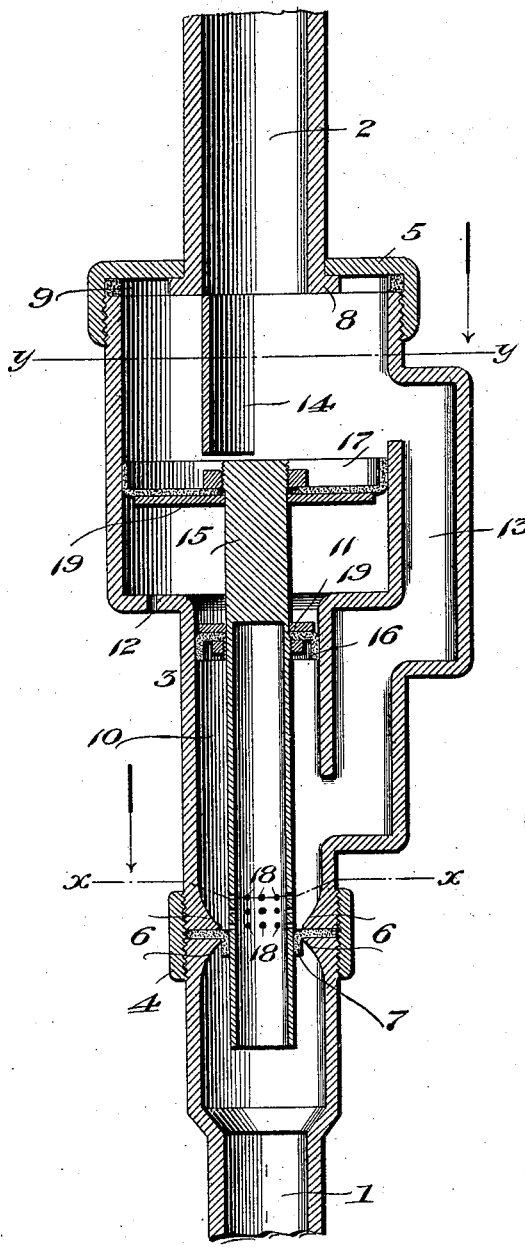
Figure 2:
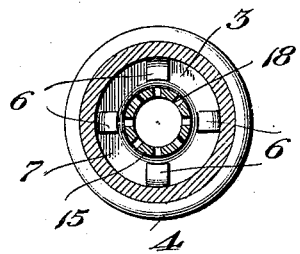
Figure 3:
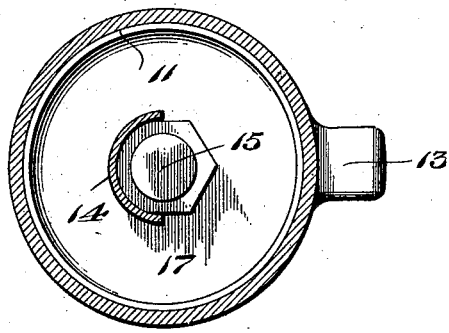

Figure 1 is a vertical section of the valve constituting the best embodiment of my invention known to me. Fig. 2 is a section taken in the plane indicated by the line $x$—$x$ of Fig. 1, looking downward. Fig. 3 is a similar view taken in the plane indicated by the line $y$—$y$ of Fig. 1, looking downward.

Similar numerals designate corresponding parts in all of the views of the drawings, referring to which:

1 is a pipe designed to lead from a street main or other source of water supply.

2 is a pipe for conducting water to a house or other point of use and designed to be equipped with one or more faucets which I have deemed it unnecessary to illustrate.

3 is the casing of my novel pressure-operated valve, which is preferably of brass.

4 is the union for effecting connection of the supply pipe 1 to one end of the casing 3, and 5 is the union connecting the eduction pipe 2 to the upper end of the casing.

As shown in Fig. 1, the adjoining portions of the pipe 1 and casing 3 are exteriorly threaded for the engagement of the union 4, and on their inner sides at their meeting ends they are provided with annular abutments 6. These latter are tapered as illustrated in order to offer but a minimum obstruction to the passage of water, and their function is to afford broad clamping surfaces for holding an interposed gasket 7, this with a view of prolonging the usefulness of the gasket and maintaining the efficiency of the valve as a whole.

The union 5 rests upon a shoulder 8 on the lower end of the pipe 2, and is interiorly threaded to engage an exterior thread on the casing 3, so as to connect the pipe and casing, and at the same time hold a packing ring 9 under pressure against the upper end of the latter.

By reference to Fig. 1, it will be manifest that the valve casing 3 comprises a piston cylinder 10, a comparatively large piston cylinder 11 having a drain aperture 12, a by-pass conduit 13 connecting the cylinders 10 and 11, and a deflector wall 14; the said wall 14 being located in the upper portion of the large cylinder 11, and having for its office to guide and facilitate the passage of water from the by-pass conduit 13 to the pipe 2 when the faucet on the latter is opened, with a view of assuring a full flow of water through the pipe 2.

Combined with the casing 3 to form my novel valve, are a stem 15 and pistons 16 and 17; the piston 16 being of a size to snugly fit cylinder 10, and the piston 17 of a size to snugly fit the cylinder 11. The upper portion of the stem 15 is solid or otherwise closed, while the lower portion thereof is hollow and open at its lower end and is provided slightly above said lower end with a plurality of perforations 18. The pistons 16 and 17 may be of any construction compatible with the purpose of my invention, without involving departure from the scope thereof, though I prefer to have them respectively comprise a washer 19 arranged against a collar on the stem 15, and a nut turned on a threaded portion of the stem and against the washer as shown in Fig. 1.

The lower hollow portion of the valve stem 15 snugly fits in and works through the gasket 7, and when the apertures 18 in said stem are below said gasket 7, it will be apparent that no water can pass from the pipe 1 into the valve casing 3. The valve stem is retained in the position stated so long as the faucet of the pipe is closed, by reason of the comparatively large area of the piston 17. When, however, the said faucet is opened and the cylinder 11 is relieved of pressure, it will be seen that the natural pressure of pipe 1 acting against the valve stem 15 will force the stem and piston upward until the apertures 18 are in the position shown—*i. e.*, above the gasket 7, when the water in pipe 1 will pass through the apertures 18 and up through the conduit 13 and in that way assure a full flow of water through the pipe 2. It will also be seen that water entering the cylinder 10 and acting against the piston 16 will assist in forcing the valve stem upward and holding the stem and pistons in the uppermost position. On the closing of the faucet connected to pipe 2, the accumulated pressure in the casing 3 operates against the comparatively large piston 17 and thereby forces the piston and valves downward against the pressure in the pipe until the apertures 18 are below the gasket 7.

As will be gathered from the foregoing, my novel valve will materially reduce the pressure behind the water, and this while permitting a full flow of water through the pipe 2 as is always desirable; also, that the valve is simple and inexpensive and embodies no delicate parts such as are liable to get out of order after a short period of use.

Having thus described my invention, what I claim and desire to secure by Letters Patent, is:

1. In a pressure operated valve, the combination with a casing comprising an upper cylinder, a lower, comparatively small cylinder, a by-pass conduit connecting the cylinders, and a gasket secured in the lower cylinder; of a stem movable through the gasket and closed at its upper end and open at its lower end and apertured at an intermediate point of its length, a piston fixed in the stem and snugly fitting in the upper cylinder, and a comparatively small piston fixed on the stem and snugly fitting in the lower cylinder.

2. In a pressure operated valve, the combination with a casing comprising an upper cylinder, a lower, comparatively small cylinder, a by-pass conduit connecting the cylinders, a deflector wall arranged in the upper cylinder at the opposite side of the outlet thereof, with reference to the by-pass conduit, and a gasket secured in the lower cylinder; of a stem movable through the gasket and closed at its upper end and open at its lower end and apertured at an intermediate point of its length, a piston fixed on the stem and snugly fitting in the upper cylinder, and a comparatively small piston fixed on the stem and snugly fitting in the lower cylinder.

3. In a pressure operated valve, the combination with a casing having an interior, annular abutment tapered at its upper side, a pipe having an interior, annular abutment tapering at its underside, a union connecting the casing and pipe, and a gasket interposed and held between the abutments of the casing and pipe; of a piston stem movable in the casing and through the said gasket.

In testimony whereof I affix my signature in presence of two witnesses.

GEORGE H. TRAXEL.

Witnesses:
A. D. COLE,
GEORGE H. WHALEY.